H. N. STROH.
METHOD AND APPARATUS FOR CALIBRATING MEASURING INSTRUMENT TRANSFORMERS.
APPLICATION FILED NOV. 22, 1918.

1,395,306.

Patented Nov. 1, 1921.

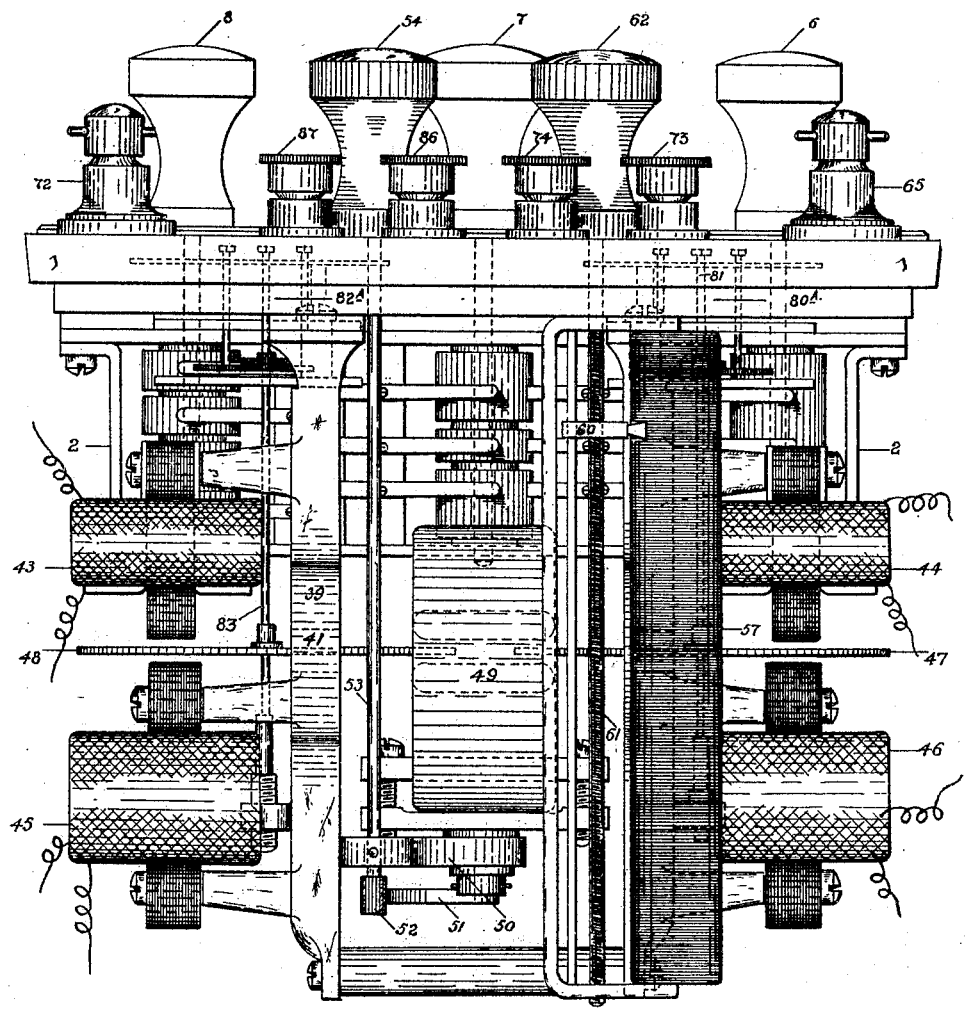

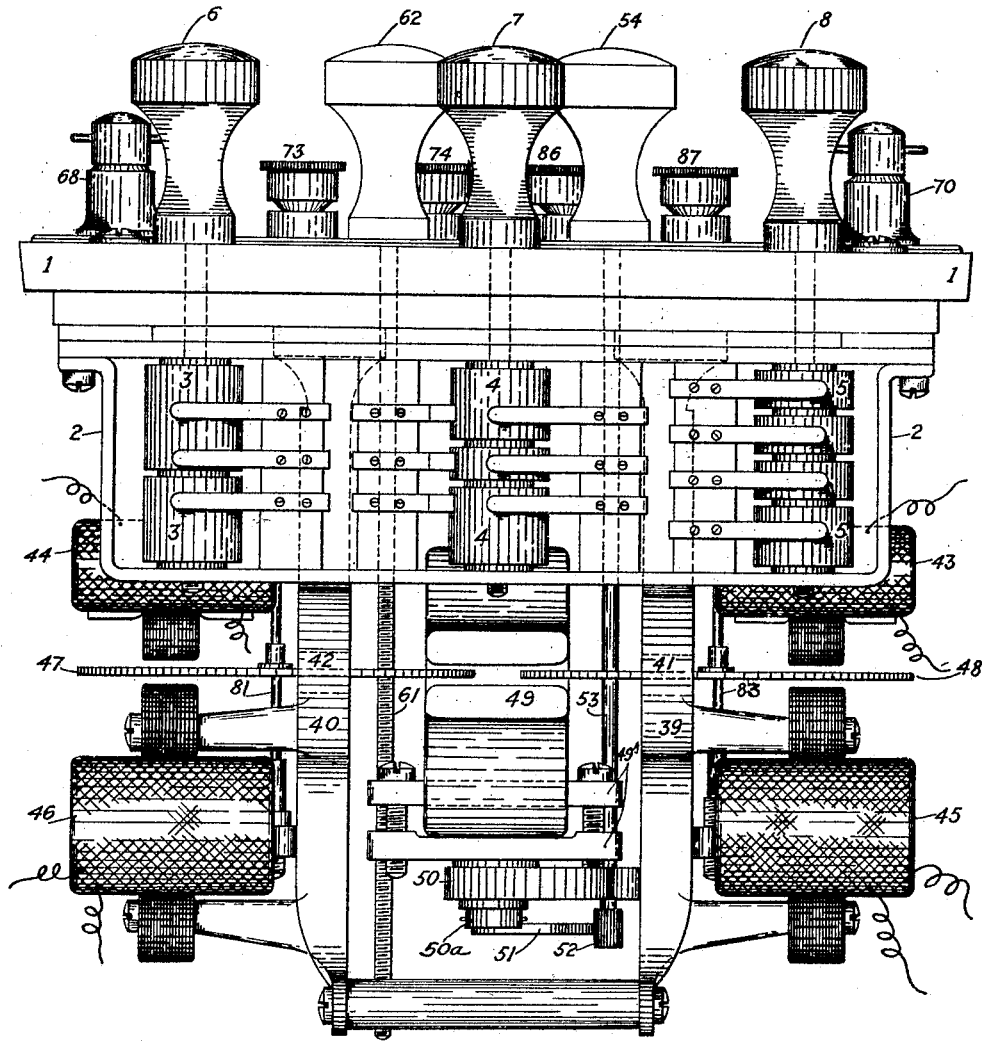

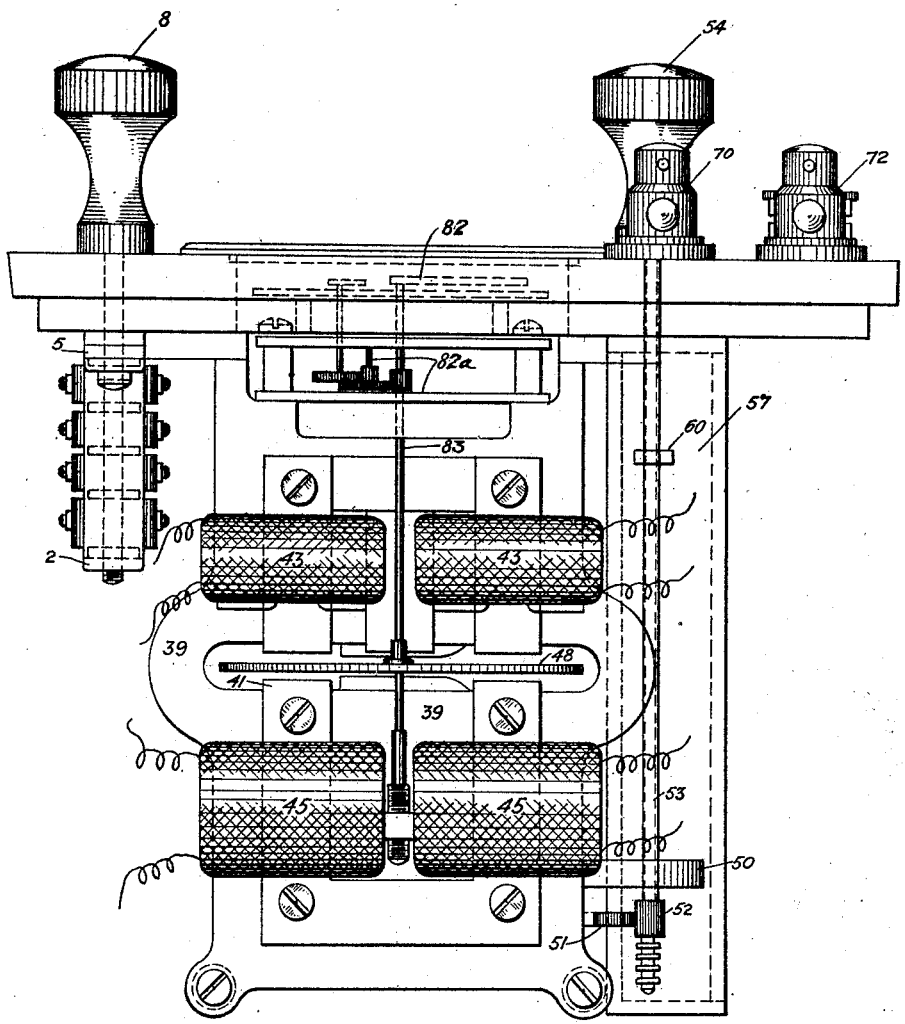

H. N. STROH.
METHOD AND APPARATUS FOR CALIBRATING MEASURING INSTRUMENT TRANSFORMERS.
APPLICATION FILED NOV. 22, 1918.
1,395,306.
Patented Nov. 1, 1921.
7 SHEETS—SHEET 5.
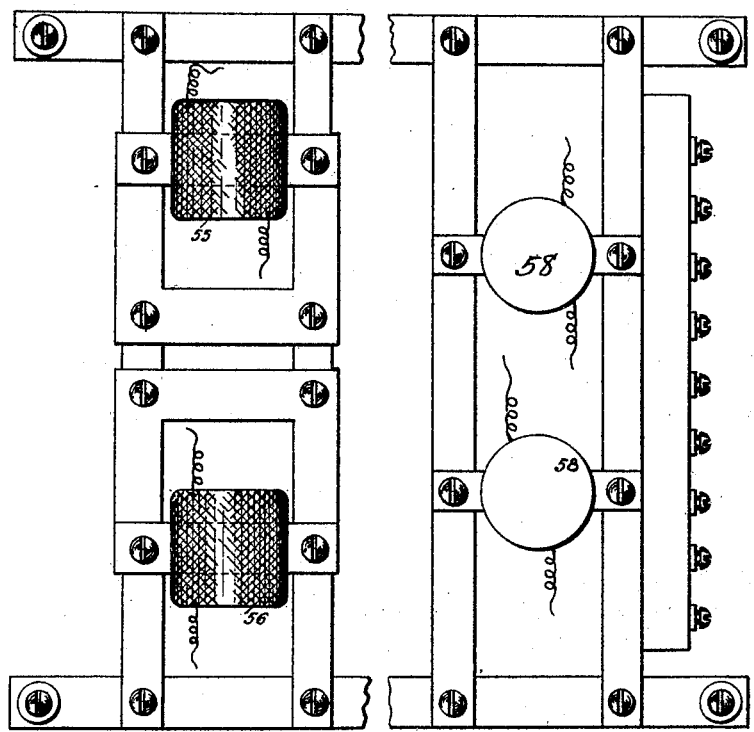

H. N. STROH.
METHOD AND APPARATUS FOR CALIBRATING MEASURING INSTRUMENT TRANSFORMERS.
APPLICATION FILED NOV. 22, 1918.

1,395,306.

Patented Nov. 1, 1921.

UNITED STATES PATENT OFFICE.

HENRY NICKOLAS STROH, OF PITTSBURGH, PENNSYLVANIA.

METHOD AND APPARATUS FOR CALIBRATING MEASURING-INSTRUMENT TRANSFORMERS.

1,395,306.　　　　　Specification of Letters Patent.　　Patented Nov. 1, 1921.

Application filed November 22, 1918. Serial No. 263,791.

*To all whom it may concern:*

Be it known that I, HENRY NICKOLAS STROH, a citizen of the United States, and residing in Pittsburgh, in the county of Allegheny, State of Pennsylvania, have invented certain new and useful Improvements in Methods and Apparatus for Calibrating Measuring-Instrument Transformers, of which the following is a specification, illustrated in the annexed drawings, and the particular novel features being more fully pointed out in the annexed claims.

This invention relates to a device for calibrating electrical apparatus, as for example, current transformers and potential transformers. One of the objects of the invention is to provide a means in a single case or box for performing all of the operations necessary to calibrate a current transformer or a potential transformer, so that the apparatus for accomplishing this result will be rendered portable and convenient of operation.

Heretofore it has been considered a difficult undertaking to check the ratio and phase angle of current and potential transformers, with reasonable accuracy in connection with electrical measuring instruments, for instance, alternating current voltmeters, ammeters and wattmeters. This is especially true when consistent and reliable results are required.

Prior to my invention it was possible to conduct tests upon current transformers by the employment of certain instruments now upon the market, but the disadvantage of these methods is the great possibility of error since such methods require two observers and two sets of instruments. For this reason there is not only possibility of error due to personal inaccuracy in reading the instruments, but on account of slight defects in the instruments themselves, which are not just suited for the purpose.

Of course it was possible heretofore to make accurate tests with laboratory apparatus, but obviously such apparatus cannot conveniently be transported from place to place.

With my device, the difference in ratio or phase angle between the primary and secondary of a current or voltage transformer can be ascertained by only one moderately skilled observer.

As illustrative of the operation of my device it will be assumed that the value of the primary and secondary winding of the current transformer is fixed at 5 amperes each, therefore when each winding has exactly 5 amperes flowing through it at the same instant, the ratio of the winding would be one to one, the desired result; but suppose the primary had 5 amperes flowing through it and the secondary only 4.8 amperes, the ratio would be equivalent to the primary amperage divided by the secondary amperage, or $\frac{5}{4.8}$ or 1.042 to 1 ratio from which the result in accuracy could be calculated.

In my device the exact magnitude of current need not be known, but the armatures of the meters are allowed to run for a period of one or two minutes, although no definite time need be employed.

It is understood, of course, that two meter elements are employed in this device, therefore it is assumed that the number of revolutions registered on the respective dials of these two elements, (one element connected into the circuit with the primary winding, and the other element into circuit with the secondary winding, of the current transformer), amounts to 2000 divisions on the dial connected into the primary winding and to 1920 divisions on the dial connected into the secondary winding, from which we can compute our ratio as 1.042 to 1.

Numerous other tests can be properly executed by proper manipulation of certain switches and resistances, reactances, etc., forming a part of this invention.

In the drawings, Figure 1 is a plan view of the invention;

Fig. 2 is a side elevational view;

Fig. 3 is a rear elevational view;

Fig. 4 is a left end view;

Figure 7:
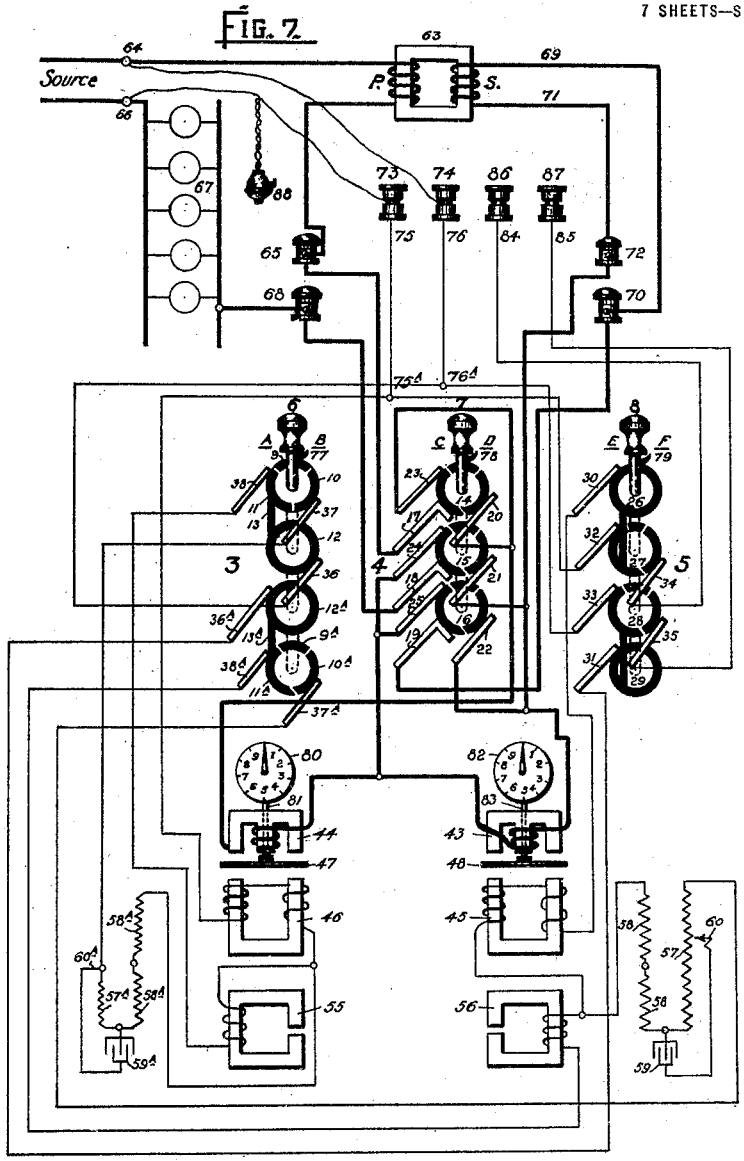
Figure 8:
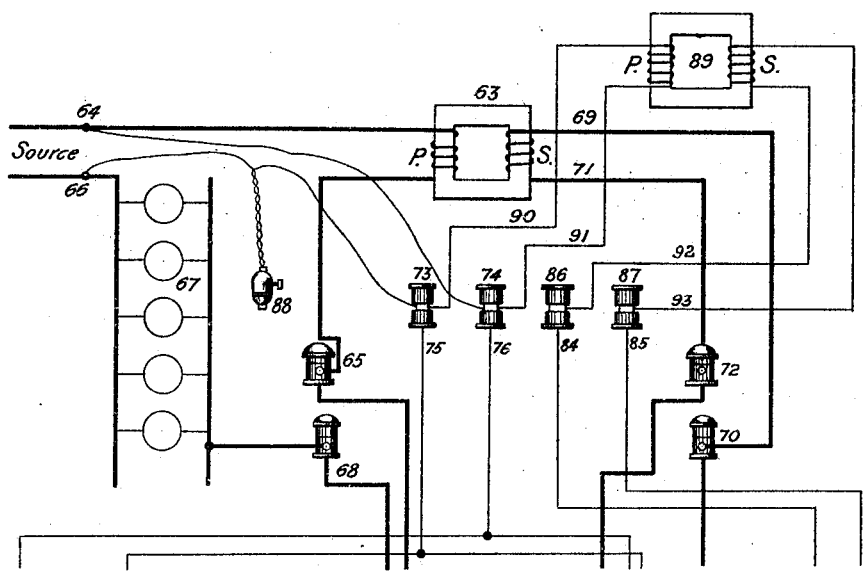

Figs. 5 and 5ᴬ are respectively plan view and side elevation of the reactances;

Figs. 6 and 6ᴬ are respectively plan view and side elevation of the resistances;

Fig. 7 is a wiring diagram of the apparatus for current transformer testing; and Fig. 8 is a wiring diagram of the apparatus for potential or voltage transformer testing.

The invention contemplates the employment of two rotating armatures with certain indicating mechanism operated thereby. Resistances, reactances and condensers, switches and means for initially synchronizing the speed of the two armatures preparatory to the test.

Referring now to the drawings in which corresponding numerals of reference indicate corresponding parts throughout the several views, 1 is a base plate preferably of hard rubber for insulation qualities and general appearance. Depending from one side of the base plate 1 is a switch frame 2 in which are located a plurality of rotatable drum switches 3, 4, and 5, adapted to be rotated by the knobs 6, 7 and 8 (Figs. 3 and 4.)

The switch 3 is shown as a double pole, double throw drum switch (Fig. 7), consisting of two pairs of spaced, insulated ring contacts. The uppermost ring is divided into three segments, 9, 10 and 11, and the next two are continuous rings 12 and 12$^A$. The upper ring is connected to segment 11 by a conductor 13. The fourth ring is divided into three segments 9$^A$, 10$^A$ and 11$^A$ Here also the third ring 12$^A$ is connected to segment 11$^A$ by conductor 13$^A$.

The switch 4 is shown as a three pole, double throw drum switch consisting of three spaced rings 14, 15 and 16, insulated from one another and each divided into three segments, the middle poles of the switch being designated by 17, 18 and 19 respectively. 20, 21 and 22 designate one set of end poles and 23, 24 and 25 designate the opposite set of end poles, the purpose of which will be described hereinafter.

The switch 5 is a double pole, double throw drum switch consisting of two sets of spaced rings 26, 27, 28 and 29, the two sets being electrically insulated from one another and each set consisting of a continuous ring and a segmental ring, one segment of each set being electrically connected to the continuous ring of its particular set.

The middle poles of this switch 5 are designated as 30 and 31. One set of end poles are designated as 32 and 33 and the other set of end poles are designated as 34 and 35.

On switch 3 the middle contacts are designated as 36 and 36$^A$, two of the outer contacts as 37 and 37$^A$, and the contact opposite thereto as 38 and 38$^A$.

Referring to Fig. 3, depending from the base plate 1, is a coil carrying frame and bearing support 39 and 40, also adapted to carry a permanent magnet 49. The frames 39 and 40 are provided with horizontal slots 41 and 42, to allow for free play of a pair of rotating disk armatures to be described hereinafter.

Carried by frames 39 and 40 (Fig. 3) are two meters of special construction, consisting in each instance of the series coils 43 and 44, the potential coils 45 and 46 with their usual connections, and the rotating disk armatures 48 and 47 respectviely.

It will be observed from Figs. 2, 3 and 4, that the frames 39 and 40 are spaced apart a sufficient distance to permit of the introduction of a suitable brake mechanism 49, 50, 51, 52, 53 to rectify the inequality of the two disk speeds. In the present instance, I have shown the brake mechanism as a permanent magnet 49 mounted by a clamp 49$^A$ on a stud 50$^A$, which is adapted to oscillate in a bearing block 50 carried by the frame, and which is operated by a gearing shown as a toothed sector 51, fastened to the stud, and pinion 52, the latter being carried by a vertical rod 53 projecting through the base plate 1 and having an operating knob 54 on its outer end.

The two poles of the magnet straddle portions of both armature disks 47 and 48 and are in such relation thereto that the magnetism of the poles may be caused to preponderate on either disk, so as to increase or diminish the retarding effect on one disk over the other, in order to accomplish equality of disk (armature) speed. This preponderance is brought about by sliding the magnet away from the center of one disk and toward the center of the other disk.

Referring to Fig. 7, 55 and 56 designate reactances suitably located in the casing and they are arranged to be placed in series with the potential elements 45 and 46 of the meters. They are shown in Figs. 5 and 5$^A$.

57 and 58 are fixed resistances suitably placed in the casing (Figs. 2, 6 and 6$^A$) and 59 is a condenser, one pole of the latter being connected to a sliding contact 60 operated by a screw spindle 61, (Fig. 2) which projects through the base plate 1 and carries an operating knob 62.

One end of the condenser 59 is connected across the resistance 57 through the sliding contact 60 (Fig. 7) and the other end of the condenser is connected to a common contact located between the resistances 57 and 58.

The operation is as follows:

Suppose it is desired to test the current transformer of one to one ratio 63, (Fig. 7) for ratio. (The meter is to be used in conjunction with a standard variable ratio current transformer, where the ratio is other than one to one). The first step is to connect the conductor 64 from the source of supply to one end of the primary winding "P" of current transformer 63, the other end of primary coil "P" to be connected to binding post 65. The conductor 66 from the source of supply is connected to one end of a load 67 here shown as five lamps. The other end of load 67 is connected to binding post 68.

The end 69 of the secondary winding S is connected to binding post 70 and its other end 71 is connected to binding post 72.

Knobs 6, 7 and 8 of the switches are assumed to stand in the positions shown in Fig. 7, i. e., having their hands 77, 78, 79 pointing respectively to B, D and F. Then the following circuits are established.

Main 64, primary P, post 65, brush 17, segment 14, brush 23, watthour-meter series yoke 44, brush 24, segment 15, brush 18, post 68, load 67, main 66.

The foregoing describes the so-called current connections. The following is a description of the voltage or potential circuit; A flexible lead, connected to main wire 64, runs to binding post 74, and then down conductor 76 where the circuit divides at 76$^A$ into two circuits, one leading down to switch 5, to brush 33 through segment 28, down through a conductor to ring 29 and out to brush 31, over to brush 36$^A$ of switch 3, to segment 12$^A$, down through strap 13$^A$ to segment 11$^A$ and out through brush 38$^A$ to reactance 56, then through a common connection to the winding upon the potential element 45 of the right hand watt hour meter, then to brush 30 of switch 5, into segment 26, down through the connection to segment 27 and out brush 32 and up to junction point 75$^A$ thence in through conductor 75 to binding post 75$^A$ over a flexible lead, and through a quick break switch 88 and out to the main 66.

The switches 3, 4 and 5 are then set as follows:

The switch 3 remains in its position shown, so its indicator 77 points to B. Switch 4 is set with its indicator 78 pointing to C (in Fig. 7 shown pointing to D), and switch 5 with its indicator 79 pointing to F, as in Fig. 7.

The positions of the switches are effective in connecting the meter elements so that the series coils 43 and 44 of the meters are thrown in series with one another and with the load by the following circuits:

Main 64, primary P, post 65, brush 17, segment 14, brush 20, series coils 44 and 43, brush 21, segment 15, brush 18, post 68, load 67, main 66. The secondary S of the transformer is now short-circuited at segment 16 of switch 4.

The potential coils 45 and 46 are in series with their respective reactances 55 and 56, although each potential coil with its reactance is connected in multiple to the source of supply, according to the circuits traced before.

The permanent magnet 49 is then manipulated by rotating knob 54 (Fig. 1) over the surface of one disk or the other so as to cause the two rotating armatures 47 and 48 to attain an exact equality of speed.

After it is determined that both armatures are moving at the same speed (by observing hands 80 and 82 of the meters Fig. 1), switches 3 and 5 are not disturbed but switch 4 is turned from position C to position D (as shown in Fig. 7), which now connects meter coil 43 into the secondary S of the current transformer 63, and also removes the short circuit of secondary S, which previously existed through switch 4, when in position C.

Figure 1:
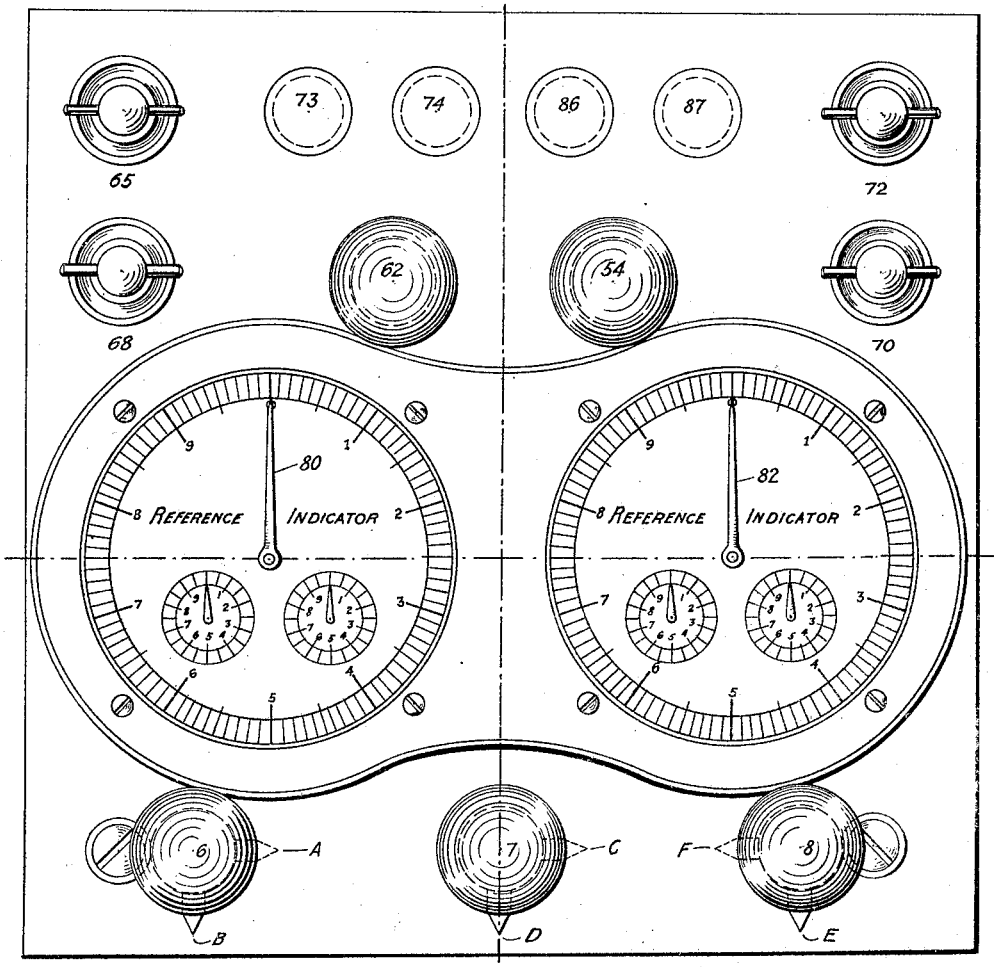

The meters with their coöperating mechanism are allowed to run for a period of time corresponding to say 2000 divisions or 200 revolutions, as indicated by the pointer 80 of the left hand indicator (Figs. 1 and 2). The three indicator dials are driven by the armature 47 through the shaft 81 and suitable gearing 80$^A$ (Fig. 2). Suppose that during the period the indicator 82 on shaft 83, similarly geared and driven by armature 48 indicates 1988 divisions or 198.8 revolutions. Inasmuch as the correct indication should have been 2000 divisions, the difference of 12 parts in 2000 is 0.6 of 1 per cent., which indicates that the current transformer 63 is 0.6 of one per cent. slow or the ratio is 1.006.

Now suppose it is desired to test the transformer 63 for phase angle or the equivalent amount which the reversed secondary current leads its primary. This small angle is measured then by the following procedure: The two armatures 47 and 48 must first be adjusted to equal speed the same as had been done in the last ratio test, which will require setting switch 3 to B, switch 4 to C, and 5 to F. After the speed is adjusted with the permanent magnet 49 by operating knob 54, the switches are again set as follows:

Switch 3 to A, switch 4 to C and switch 5 to F (this operation replaces the reactances 55 and 56 by resistances 58$^A$, 57$^A$ and 58, 57). Now speed equality should again be accomplished by adjusting knob 62 which operates a contact 60, controlled by the threaded spindle 61, over resistance unit 57, in Fig. 2. (The other resistance 57$^A$ has a fixed connection 60$^A$). This last mentioned adjustment changes the effective electrostatic capacity of condenser 59 in the potential circuit of watthour meter element which will be connected into the secondary S of the current transformer. The reason for this adjustment is the following:

Since we are endeavoring to check the current transformers for phase angle or the equivalent angle by which the reversed secondary leads its primary, we will be obliged to introduce a large phase displacement, or relative angle between the primary current and voltage in the main circuit. This value we shall fix at 50 per cent. power factor or an angle of 60 electrical degrees or 3600 minutes, and this is accomplished by causing the current flowing in the potential circuit of the watthour meter elements 46 and 45 to lead. That is, we will substitute the two reactances 55 and 56 for respective resistances 57$^A$, 58$^A$ and 57, 58, the former having a fixed quantity of electrostatic capacity by the connection at 60$^A$, and the latter an adjustable amount of electrostatic capacity by the adjustable contact at 60 as in Fig. 7.

This change of substituting capacities in the place of reactances will cause the disk speed to become just one half of its former speed when the ratio test was being conducted, although the voltage across lines 64 and 66 remains exactly the same and although the load 67 has not been changed, and the same current will flow through the series coils 44 and 43. But since the product of the energy in the ratio test formerly described, was 100 volts ×5 amperes or 500 volt amperes, and we can assume a relative speed of 5000 divisions for a given time, now then by introducing a correct amount of phase displacement in the rotating magnetic field of the meter elements (so as with the same voltage and current in the main circuit), we only need 2500 divisions of the meter dials over the same length of time used in the foregoing test. A similar condition would exist had we introduced the required self-induction in the load circuit 67. This would reduce the disk speed to half value, and be equivalent to a current of $2\frac{1}{2}$ amperes ×100 volts or 250 volt amperes, therefore, 250/500=0.5 or the equivalent of 50 per cent. power factor, or an equivalent angle of 60 electrical degrees, and equal to a cosine of 0.5.

After the two indicators 80 and 82 have assumed the same speed by manipulating the adjustable capacity in the potential element 45 through knob 62 and contact 60, switch 4 is rotated so that its indicator 78 points to D, establishing the circuit connections by switch 4, described before, and a test is conducted by setting forth indicator pointers 80 and 82 upon zero. Then indicator 80 is permitted to make 100 revolutions after which number it is stopped by quick break switch 88. Now, assuming that indicator 80 has registered exactly 1000 divisions and indicator 82 registered 985 divisions, we will note that the error of the gross registration at 50 per cent. power factor would be 1.5 of one per cent. slow. This figure includes the ratio error of 0.6 per cent. slow, formerly determined, which would indicate that the additional error of the phase angle at 50 per cent. power factor in the main circuit over that of the ratio is equal to 0.9% minus, and in order to reduce that quantity in an expression of minutes, I give the following formula:

$$\text{Phase angles in minutes} = \frac{\% \text{ error} \times 10800}{\pi \times \tan. \Phi \times 100}$$

Where 10800=the theoretical angle between primary and secondary vector currents in minutes $$\pi = 3.1416,$$

Tan.Φ=tangent corresponding to the cosine of angle or power factor of the main circuit, Therefore the phase angle in minutes=

$$\frac{.9 \times 10800}{3.14 \times 1.73 \times 100} = \frac{97.2}{5.43} = 17'.$$

Suppose it is desired to check a potential or voltage transformer of 1 to 1 ratio. (The meter is to have a standard variable ratio voltage transformer when the ratio is other than 1 to 1). This is shown in Fig. 8. Conductor 64 is then directly connected to binding post 65, and the circuit runs from there down to brush 17 of switch 4; (this switch 4 to be rotated so that its indicator 78 points to C, which is equivalent to placing the two series meter coils in series) thence into segment 14 out of brush 20 down to series coil 44 over to a common junction and over to series coil 43, out of this coil 43 up to brush 21, through segment 15 and out brush 18 to the conductor leading up to binding post 68; from there out to load 67 (which would be approximately 5 amps.) to conductor 66 of the main circuit. This completes the current circuit.

The next step is to connect the primary P of the voltage transformer 89 to be tested, to the binding posts as follows:

Lead 90 from P to post 73, lead 91 from P to post 74, lead 92 from secondary S to post 86, lead 93 to post 87. Thus when quick break switch 88 is closed, the primary P of the voltage transformer is energized; also there will be a secondary voltage at binding posts 86 and 87. Prior to checking voltage transformer 89 for ratio, the meter elements 47, 48 should be adjusted for equality of speed.

This operation is exactly the same as that for the current transformer ratio checking, previously described. The switch settings are as follows:

Switch 3 to A; 4 to C and 5 to F. After obtaining speed equality switch 5 is set so that its indicator 79 points to E, thus the secondary of the voltage transformer 89 is connected to the potential element 45 of the watt hour meter and the circuit wiring now set causes the current to pass through lead 92 down to binding post 86, to conductor 84 down to brush 34 of switch 5, as in Fig. 7, through segment 27, up the strap connection to ring 26 and out to brush 30, down to potential coils 45, through reactance 56, up to brush 38$^A$ of switch 3, to segment 11$^A$, up through the strap connection to ring 12$^A$, out brush 36$^A$, to brush 31, on switch 5 to ring 29 up the strap connection to segment 28, to brush 35 and up to binding post 87, by way of conductor 85, from this post 87 to conductor 93 and to the other end of voltage transformer secondary.

Now, then, both indicators are set to start at zero, and a check reading is taken over a period of time sufficient to register (200 revolutions or) 2000 divisions upon the reference indicator 80. Let us assume that during this time indicator 82 has registered 2010 divisions, or 10 divisions in excess of the reference quantity, therefore, since the ratio is equal to primary divisions divided by secondary divisions, our ratio would be .995 and the equivalent error would be 0.5 of one per cent. fast.

Now, suppose we were to check the phase angle of this voltage transformer 89, then the connections of the main circuit are from 64 to binding post 65 down through switch 4 to both series coils, then back to binding post 68 to load 67 (approximately 5 amperes). The switch 3 should be set to B, switch 4 to C and switch 5 to F. Then adjust the speed of the indicators to be alike, by rotating knob 54, after which switch 3 should be rotated so that its indicator 77 points to A and again adjustment for speed equality by rotating knob 62, should be made which is equivalent to adjusting the capacity 59 over resistance 57 by adjustable contact 60 by knob 62 and screw spindle 61 (Fig. 2). Next, rotate switch 5 so that its indicator 79 points to E which is equivalent to introducing the secondary of voltage transformer 89, the circuit being set as in the ratio check.

The next operation is to set both indicators at zero and after closing the main circuit at 64 and 66, close switch 88 until reference indicator 80 registers 1000 divisions after which the reading at the indicator 82 can be taken and the results be deduced. Suppose the reading had been 1030, or a difference of 30 divisions more than the reference dial. Since 30 parts in 1000 is equal to three per cent. (which is the gross error, ratio and phase angle, combined of the potential transformer 89 used in connection with the calibrator at a power factor in the main circuit of 50 per cent.) and in a positive direction. Therefore, from this 3 per cent. plus deduct the ratio error of 0.5 per cent. leaving 2½ per cent. error due to phase angle. In order to reduce this per cent. error to the equivalent number of minutes, one can employ the same formula as that used for the current transformer, i. e., Phase angle number of minutes =

$$\frac{\% \text{ error} \times 10800}{\pi \times \tan \Phi \times 100} = \frac{2.5 \times 10800}{3.14 \times 1.73 \times 100} \text{ or } 49'$$

One of the principal advantages of my novel instrument is that, in preparing the same for a transformer test, it does not require in itself first a calibration according to any international value or reference to other standards. For instance, the instrument itself need not first be calibrated by any ammeter, voltmeter or wattmeter for its accuracy, because the transformer test in which this instrument is used is nothing more than an observation of a number of revolutions within a given time, between the primary and secondary circuits of the transformer. The meters could make for instance, fifty revolutions per minute, each at a given load one day, and the next day they may make only 48 each, at the same load, a difference of 4%. Nevertheless, this difference would not impair the accuracy of a transformer test in either case, because the readings and comparisons between the two watthour meter readings are only relative. Therefore my novel device will never require an original or subsequent calibration in terms to any recognized standard meter.

Moreover, this instrument is not affected by external influences, such as voltage, frequency, varying wave forms and to a certain extent stray-fields, existing in its neighborhood, because both wattmeter elements, having the same characteristics, will be affected alike and consequently no errors from any of the aforementioned disturbances may arise.

I claim:—

1. A calibrating device for instrument transformers comprising two similar watthour meters adapted to be connected to the primary and secondary windings of the transformer to be calibrated and means for equalizing the speeds of the meters.

2. In a device for calibrating instrument transformers, the combination with two identical watthour meters of a plurality of independent switch elements connected to the meters and to the transformer to be tested, one meter being thereby connected to the primary and the other to the secondary of the transformer to compare the amount of current and voltages passing through the meters within a given period of time, and circuit connections and means for equalizing the speed of the meters relatively to each other before the test is made.

3. A calibrating device for instrument transformers comprising two similar watthour meters adapted to be connected to the primary and secondary windings of the transformer to be calibrated and a single means for equalizing the speeds of the meters.

4. In a device for calibrating instrument transformers, the combination with two identical watthour meters of a plurality of independent switch elements connected to the meters and to the transformer to be tested, one meter being thereby connected to the primary and the other to the secondary of the transformer to compare the amount of current and voltages passing through the meters within a given period of time, a permanent magnet disposed between the meters in suitable position to affect both meter rotors, and means for adjusting said magnet to more or less affect one rotor or the other, as desired, to equalize the speed of the meters before the transformer calibration is made.

5. A calibrating device for instrument transformers comprising two similar watthour meters adapted to be connected to the primary and secondary windings of the transformer to be calibrated and a single damping magnet for equalizing the speeds of the two meters.

6. A device for calibrating instrument transformers comprising two similar induction-motor meters, means for equalizing the speeds thereof when they are both connected in series and switching means for connecting one meter in circuit with the primary winding and the other meter in circuit with the secondary winding of the transformer to be calibrated.

7. A device for calibrating instrument transformers comprising two similar induction-motor meters, means for equalizing the speeds thereof when they are both connected in series, switching means for connecting one meter to the primary and the other to the secondary winding of the transformer to be calibrated, and a casing for said meters, speed-equalizing means and said switching means.

8. A device for calibrating instrument transformers comprising two similar induction-motor meters, means for equalizing the speeds thereof when they are both connected in series, switching means for connecting one meter to the primary and the other to the secondary winding of the transformer to be calibrated, and a portable casing for said apparatus.

9. A device for calibrating instrument transformers comprising two induction-motor meters, means for equalizing the speeds thereof, switching means for changing the connections of the meters to the transformer to be calibrated, and a portable casing for said apparatus.

10. A device for calibrating instrument transformers comprising two motor meters, means for equalizing the speeds thereof, reactors, resistors and condensers, switching means for connecting the meters to the transformer and the reactors, resistors and condensers, and a portable casing for said apparatus.

11. A device for calibrating instrument transformers comprising two motor meters, a permanent magnet for equalizing the speeds thereof, reactors, resistors and condensers, switching means for changing the connections of said meters to the transformer and the reactors, resistors and condensers, and a casing for said devices.

12. A device for calibrating instrument transformers comprising two motor meters, means for equalizing the speeds thereof when they are connected in series, and means for connecting one to the primary and the other to the secondary of the transformer whereby the ratio of the two speeds may be obtained.

13. A device for determining the ratio and phase angle of an instrument transformer comprising two motor meters, means for equalizing the speeds thereof, means for observing the difference in speeds of the meters when connected to the transformer, and a casing for said apparatus.

14. A device for determining the phase angle of an instrument transformer comprising two motor meters, a permanent magnet for equalizing the speeds thereof, resistors connected in circuit with the potential windings of the meters, condensers connected in shunt to the resistors, means for adjusting the connection of the condensers to the resistors to obtain equalization in speed, and means for observing the speeds when one meter and its respective resistor and condenser are connected to the primary and the other meter and its resistor and condenser are connected to the secondary of the transformer after the speeds have been equalized.

15. A device for calibrating an instrument transformer comprising two motor meters normally having the same speed, a resistor connected in series with the potential winding of each meter, a condenser connected in shunt relation to the resistor, means for adjusting the connections of one condenser to its resistor to equalize the speeds of the meters, and means for connecting one meter and its resistor and condenser to the primary winding and the other meter and its resistor and condenser to the secondary winding of the transformer after the speeds are equalized to obtain, by the ratio of the speeds, a measure of the gross error of registration incident to ratio and phase-angular displacement.

16. A device for calibrating an instrument transformer comprising two motor meters, means for connecting the motor meters in series with the primary winding of the transformer to be calibrated and for short-circuiting the secondary winding thereof, means for equalizing the speeds of the meters when connected in series, and means for connecting one meter in circuit with the primary winding and the other meter in circuit with the secondary winding of the transformer to be calibrated.

HENRY NICKOLAS STROH.